United States Patent

Paysan

Patent Number: 5,918,075
Date of Patent: Jun. 29, 1999

[54] ACCESS NETWORK FOR ADDRESSING SUBWORDS IN MEMORY FOR BOTH LITTLE AND BIG ENDIAN BYTE ORDER

[76] Inventor: Bernd Paysan, Stockmannstrasse 14, D-81477 Munich, Germany, D-81477

[21] Appl. No.: 08/984,685

[22] Filed: Dec. 3, 1997

[30] Foreign Application Priority Data

Dec. 20, 1996 [DE] Germany ............................ 196 53 568

[51] Int. Cl.$^6$ ...................................................... G06F 13/00
[52] U.S. Cl. ............................................ 395/898; 395/886
[58] Field of Search ............................. 395/380, 390, 395/565, 898, 307, 312, 871, 885, 886; 711/212

[56] References Cited

U.S. PATENT DOCUMENTS

| | | | |
|---|---|---|---|
| 4,523,276 | 6/1985 | Maejima et al. ........................ | 711/100 |
| 5,477,543 | 12/1995 | Purcell ..................................... | 370/537 |
| 5,524,256 | 6/1996 | Turkowski ............................... | 395/898 |
| 5,655,065 | 8/1997 | Robertson ................................ | 345/433 |
| 5,687,328 | 11/1997 | Lee .......................................... | 395/306 |
| 5,721,957 | 2/1998 | Huang et al. ............................ | 395/886 |

*Primary Examiner*—Krisna Lim
*Assistant Examiner*—Viet Vu
*Attorney, Agent, or Firm*—Michael J. Striker

[57] ABSTRACT

The access network selects $2^m$ byte-size subwords for little or big endian byte order from a $2^n$ byte-sized memory word with $0 \leq m \leq n$. The access network includes $2^n$ $2^n$:1 multiplexers and a device for generating control signals for the multiplexers. The control signal for the multiplexer for the ith byte is formed by inverting or copying address bits above alignment of the subword for the multiplexer selecting the ith byte with the least address, byte 0, and by setting address bits below alignment of the subword to 0 or 1 for big or little endian byte order. The device for generating the control signals generates the control signal for the multiplexer for the byte i with an exclusive "or" of the subword address i with the control signal for byte 0. By using common parts space can be saved in the access network.

5 Claims, 2 Drawing Sheets

ACCESS NETWORK FOR ADDRESSING SUBWORDS IN MEMORY FOR BOTH LITTLE AND BIG ENDIAN BYTE ORDER

BACKGROUND OF THE INVENTION

Modern CPUs have physically word-wise organized memories. A word consists of multiple bytes. Usually the byte number is a power of two. However the programming model organizes memory byte-wise. Therefore subword accesses to memory must extract and insert subwords in the correct position of a memory word.

Words are organized using two different byte orders, little (least significant byte first) and big (most significant byte first) endian.

The size of subwords typically is also a power of two. Access to words and subwords is simpler, if the word is partitioned in subwords of equal size, thus access happens at aligned addresses.

Positions in the word (subword address) and addresses of the word in memory (memory address or word address) should be distinguished from each other.

Conventionally, access of subwords is done using multiplexers on the read side, and demultiplexers on the write side. Bi-endian usually is supported by binary inverting the subword's address part. This changes the order of the bytes stored in memory (while words are stored the same in both byte orders).

The disadvantage of this approach is that programs using different byte orders to represent data may not share their (mostly byte-wise organized) data. Therefore, some CPUs use byte swap operations to load and store data in the other endianess, or even include byte swap operations in the load/store path. However, this lengthens the time needed for reads and writes, thus eventually lengthens the critical path. Furthermore more gates are required.

SUMMARY OF THE INVENTION

The purpose of the invention is to minimize time and gate requirements for read and write operations, while allowing word and subword access in little and big endian byte order. This invention uses a multiplexer network to do subword selection, subword merging and byte swap in one step for aligned access.

According to the invention, the access network for selecting $2^m$ byte-sized subwords for little or big endian byte order from a $2^n$ byte-sized memory word with $0 \leq m \leq n$ comprises $2^n$ $2^n$:1 multiplexers and means for generating control signals for the multiplexers, wherein each multiplexer includes means for selecting one byte out of the $2^n$ bytes of one of the memory words, and the means for generating the control signals includes means for inversion or copying of address bits above alignment of the subword for the multiplexer selecting the byte with the least address, byte 0, and means for setting address bits below alignment of the subword to 0 or 1 for big or little endian byte order; wherein the control signal for the multiplexer for the byte i is an n bit signal, the byte i being determined by counting from the byte with the least address as byte 0, and the means for generating the control signals generates said control signal for the multiplexer for the byte i by means of an exclusive or of the subword address i with the control signals for the byte 0.

Preferred embodiments are described in the following detailed description and claimed in the appended dependent claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
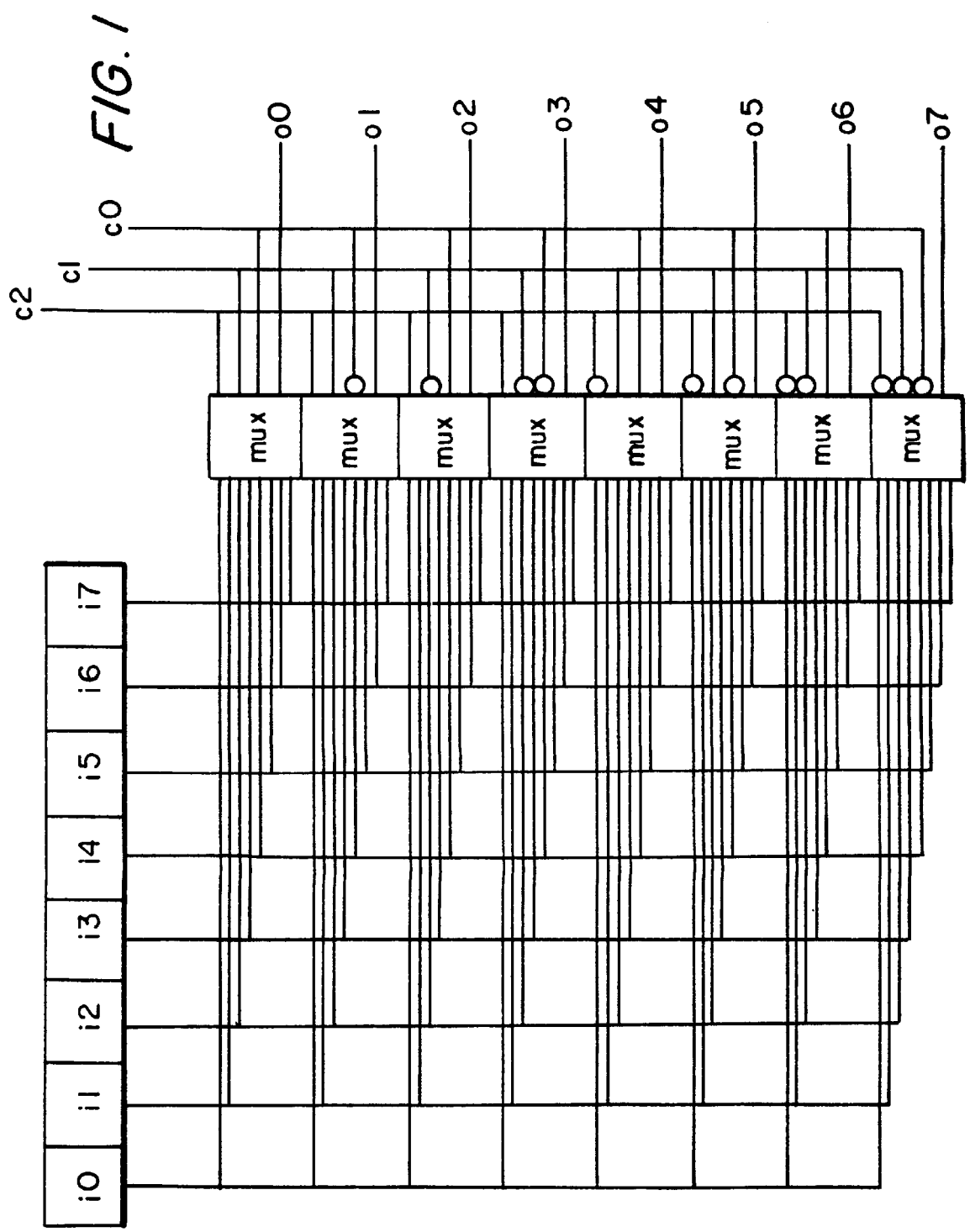
FIG. 1 is a simplified schematic diagram of a part of one embodiment of an access network for selecting subwords according to the invention.

For a $2^n$ memory word the unit consists of $2^n$ byte-wide multiplexers, wherein each multiplexer selects one byte out of $2^n$. Each multiplexer has a n bit control signal (0 to $2^n$-1, 0 selecting the first, $2^n$-1 the last input). Inverting bits of the control signal changes the selection so that the appropriate values for each output byte are selected. An access network according to the invention for the case of n=3 (8 byte memory words) is shown in a simplified representation in FIG. 1.

Table 1 shows how the input bytes are selected out of an eight byte word. Each column shows output most significant (row 0) to least significant (row 7). Each row shows byte selections for different control signals (0 to 7). Bold digits show the various positions of the most significant bytes in big endian byte order, italics digits those in little endian byte order.

TABLE 1

| Address | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

The control signal of byte i is the control signal of byte 0 exclusive ored with the subword address i. The control signal of byte 0 is computed differently for load operations and store operations, for different byte orders, and for different subword positions as follows:

If subwords are placed at the least significant position in the CPU word (i.e. integer numbers), the control signal is computed from the subword address as follows: the bits above natural alignment are inverted, the bits below natural alignment are 0 for big endian, 1 for little endian.

If subwords are placed at the most significant position in the CPU word (i.e. fractional numbers), the bits above natural alignment of the subword address are not inverted, the bits below 0 for big endian, 1 for little endian accesses.

For load operations, the input of the multiplexer is the value from memory. From the output the subword has to be masked out in a conventional way by computing a byte mask, and ANDing each bit of the byte mask with each bit of the corresponding byte.

For store operations, the input of the multiplexer is the value from the CPU register. From the output the subword has to be merged with the memory word in a conventional way, by computing a valid mask, with each valid byte (mask bit 1) selected from the output of the multiplexer, and each invalid byte (mask bit 0) selected from memory. Only valid bytes may be written in a known way to memory.

Each multiplexer with $2^n$ inputs can be composed using cascaded multiplexers with two inputs (2:1-multiplexers), with a cascade depth of n. This would result in $2^n-1$ 2:1 multiplexers, thus seven 2:1 multiplexers for a 64 bit word. Because of the selection properties, n 2:1 multiplexers are sufficient, because they can be shared between different paths, In fact, two 2:1 multiplexers from two different $2^n$:1 multiplexers can be merged using 2:2 multiplexers (multiplexers with two inputs and two outputs), where the control signals are a bit of the control signal and its inversion.

Figure 2:
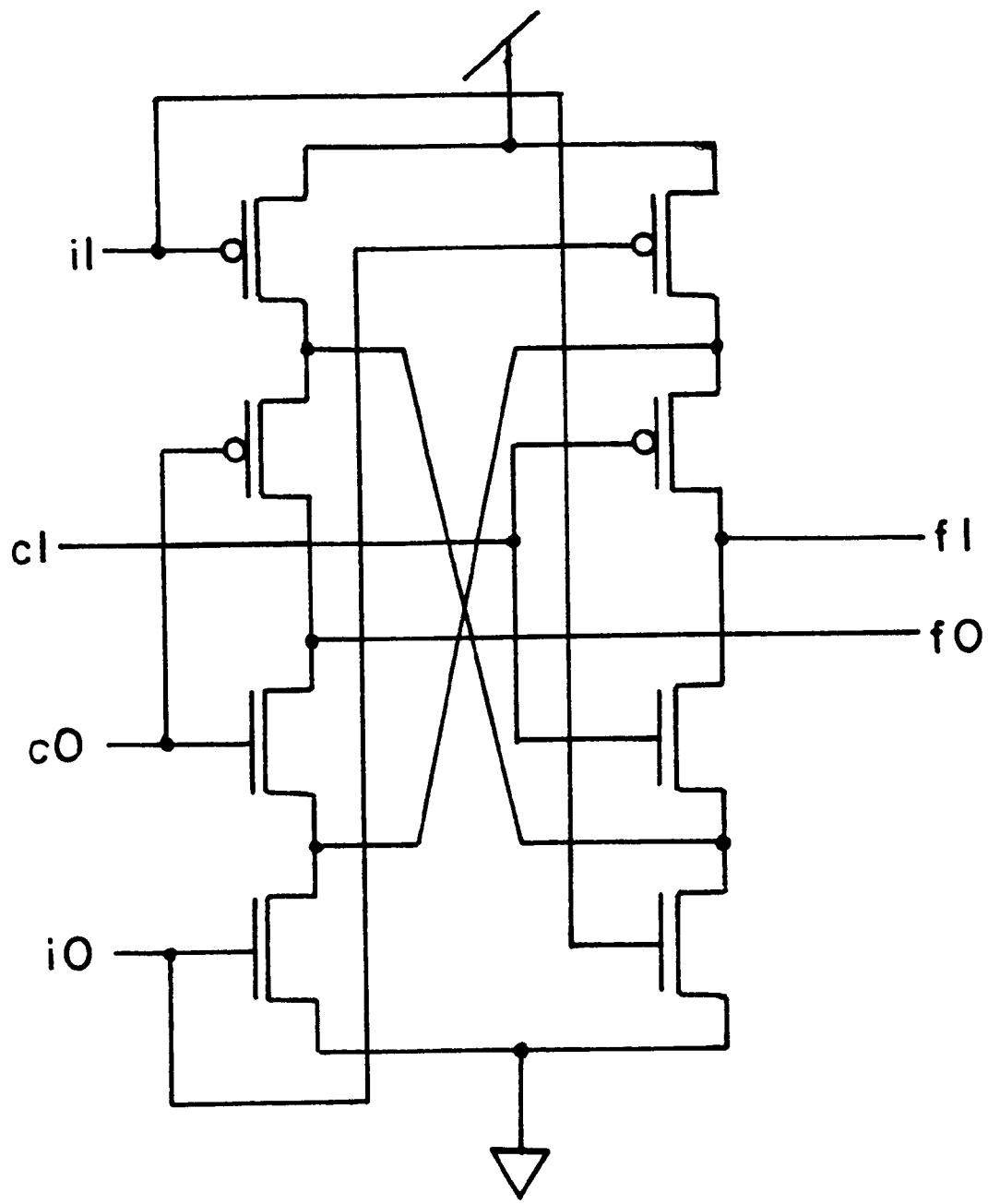
FIG. 2 is a net list of a one-bit 2:2 multiplexer in CMOS technology which is part of a preferred multiplexer for a preferred embodiment of the access network according to the invention.

FIG. 2 shows a transistor net list of a one-bit 2:2-multiplexer in CMOS technology. This multiplexer computes $$f_0 = c_0 \cdot i_0 \oplus c_0 \cdot i_1$$

$$f_1 = c_1 \cdot i_0 \oplus c_1 \cdot i_1$$

with a gate delay roughly equal to a NAND-gate with two inputs, wherein $c_0$ and $c_1$ are control signals, $i_0$ and $i_1$ are inputs, and $f_0$ and $f_1$ are outputs. The n one-bit multiplexers are combined in a known way to form an n-bit multiplexer.

The advantages obtained from the invention can be illustrated with the example of a 64 bit memory word as follows.

For a 64 bit memory word, four eight bit 2:2 multiplexers are required, each selecting between even and odd byte pairs using the least significant control bit as input $c_0$, and the complement as $c_1$, thus $c_1 = c_0$. Two 16 bit 2:2 multiplexers select between the even and odd tw-bit pairs using the second control signal bit and its complement as above, and one 32 bit 2:2 multiplexer selects between the even and odd half word pair, using the most significant control signal bit as above.

Thus for 64 bits the unit has a critical path of three inverting multiplexer gates and one inverter, and a total number of 96 2:2 multiplexers and 64 inverters or 896 transistors. As both read-to-memory and write-to-memory operations do an inversion, it can be omitted, if it is tolerable to store inverted values in memory.

It is assumed that multiplexer setup and control signal computation isn't critical, because this can be done as part of the address computation, and therefore the setup of the multiplexer can be easily hidden in the cache address time.

I claim:

1. An access network for selecting $2^m$ byte-sized subwords for little endian byte order or big endian byte order from a $2^n$ byte-sized memory word with $0 \leq m \leq n$, said access network comprising $2^n$ $2^n$:1 multiplexers and means for generating control signals for said multiplexers, wherein each of said multiplexers includes means for selecting one byte out of the $2^n$ bytes of one of said memory words, and said means for generating said control signals includes means for inversion or copying of address bits above alignment of one of the subwords for the multiplexer selecting the byte with the least address, byte 0, and means for setting address bits below alignment of said one of the subwords to 0 to 1 for said big or little endian byte order; wherein said control signal for the multiplexer for the byte i is an n bit signal, said byte i being determined by counting from said byte with the least address as byte 0, and said means for generating the control signals generates said control signal for the multiplexer for the byte i with an exclusive "or" of the subword address i with said control signal for said byte 0.

2. The access network as defined in claim 1, wherein said $2^n$:1 multiplexer comprises cascaded 2:1 multiplexers with a cascade depth of n, wherein common 2:1 selections are performed by means of common ones of the cascaded 2:1 multiplexers.

3. The access network as defined in claim 2, wherein said $2^n$:1 multiplexer comprises n $\log_2 n$ byte-wide 2:1-multiplexers.

4. The access network as defined in claim 2, wherein all pairs of said cascaded 2:1-multiplexers that select identical ones of said bytes with complementary ones of said control signals are combined in a 2:2-multiplexer.

5. The access network as defined in claim 1, wherein said $2^n$:1 multiplexer comprises $\{n/2\}\log_2 n$ byte-wide ones of said 2:2-multiplexers.

\* \* \* \* \*